United States Patent
Lee

(10) Patent No.: US 9,474,110 B2
(45) Date of Patent: Oct. 18, 2016

(54) AC DIRECT DRIVE LED POWER SUPPLY CAPABLE OF HANDLING OVERVOLTAGE

(71) Applicant: EneBrain Co., Ltd., Gyeonggi-do (KR)

(72) Inventor: Dae-Young Lee, Gyeonggi-do (KR)

(73) Assignee: ENEBRAIN CO., LTD., Suwon-si, Gyeonggi-do (KR)

( * ) Notice: Subject to any disclaimer, the term of this patent is extended or adjusted under 35 U.S.C. 154(b) by 189 days.

(21) Appl. No.: 14/141,528

(22) Filed: Dec. 27, 2013

(65) Prior Publication Data

US 2015/0156835 A1    Jun. 4, 2015

(30) Foreign Application Priority Data

Dec. 2, 2013 (KR) .................. 10-2013-0148557

(51) Int. Cl.
*H05B 33/08* (2006.01)

(52) U.S. Cl.
CPC .......... *H05B 33/0812* (2013.01); *Y02B 20/345* (2013.01)

(58) Field of Classification Search
CPC .................. H05B 33/0812; Y02B 20/345
See application file for complete search history.

(56) References Cited

U.S. PATENT DOCUMENTS

| | | | | |
|---|---|---|---|---|
| 2010/0264832 | A1* | 10/2010 | Archenhold ....... | H05B 33/0866 315/152 |
| 2012/0153833 | A1* | 6/2012 | Mikani ............ | H05B 33/0845 315/122 |

FOREIGN PATENT DOCUMENTS

KR    10-2011-0090201 A    8/2011

* cited by examiner

*Primary Examiner* — Douglas W Owens
*Assistant Examiner* — Laura Yesildag
(74) *Attorney, Agent, or Firm* — Rabin & Berdo, P.C.

(57) ABSTRACT

Provided is an alternative current (AC) direct drive light emitting diode (LED) power supply handling an overvoltage. The AC direct drive LED power supply includes a power input unit receiving an AC power, a rectifier unit for generating an undulating current by rectifying the AC power outputted from the power input unit, an LED array unit connected to receive the undulating current from the rectifier unit and formed of one or more LED modules, a constant current control unit connected to the LED array unit and controlling so as to allow a certain rated current or less to flow by modifying a waveform of the undulating current applied to the LED array unit, and a voltage-based current control unit driven by a voltage of both ends of the constant current control unit and continuously decreasing a current value of an overvoltage supplied form the power input unit according to a level of the overvoltage.

1 Claim, 12 Drawing Sheets

AC DIRECT DRIVE LED POWER SUPPLY CAPABLE OF HANDLING OVERVOLTAGE

CROSS-REFERENCE TO RELATED APPLICATIONS

This U.S. non-provisional patent application claims priority under 35 U.S.C. §119 of Korean Patent Application No. 10-2013-0148557, filed on Dec. 2, 2013, the entire contents of which are hereby incorporated by reference.

BACKGROUND OF THE INVENTION

The present invention disclosed herein relates to an alternative current (AC) direct drive light emitting diode (LED) power supply capable of handling an overvoltage, and more particularly, to an AC direct driver LED power supply, when an overvoltage exceeding a reference voltage is instantaneously or continuously supplied, effectively controlling a current for each phase according to a voltage to minimize heat emission and to prevent a damage of an LED light source caused by the overvoltage by reducing a power load on the power supply, thereby providing safety of a power supply unit and simultaneously providing high efficiency and a high power factor.

Recently, light emitting diodes (LEDs) largely increase in brightness, have a longer life and a smaller energy consumption amount than other general lightings such as incandescent lamps and fluorescent lamps, and are echo-friendly, which are considered as alternative lighting sources of general lighting devices.

Generally, LED drive devices using an alternative current are designed to be formed of a serial array of a plurality of LEDs with appropriate intervals and to allow a voltage thereof is set up and controlled using a switch controlled by a current.

General LED drive devise using constant current circuits have a structure, in which a plurality of constant current circuits having different current values are formed for each stage to provide current properties as a stepped shape. Korean Patent Registration No. 10-1064906 (registered on Sep. 7, 2011) discloses "LED lighting device", which shows a similar example.

FIG. 1 is a circuit diagram of a general LED drive constant current circuit having a multistage structure. As shown in FIG. 1, a power supply input 11 receiving an applied AC voltage converts the AC voltage into a direct current (DC) voltage using a rectifier part 12 and inputs the DC voltage into LED arrays 31, 32, and 33 including a plurality of LEDs. That is, as shown in FIGS. 2A, 2B, and 2C, a waveform A of a voltage passing through the rectifier part 12 is shown as a waveform B of an input current passing through constant current control parts 21, 22, and 23.

In this case, a corresponding undulating voltage is allowed to flow less than a rated current defined by constant current control parts 21, 22, and 23 to protect an LED. However, when a voltage higher than a reference voltage is inputted, a voltage exceeding a voltage set up by the LED is to be managed by a drive unit. Due thereto, the drive unit consumes power corresponding to a value obtained by multiplying an exceeding amount of the voltage by a current defined by the drive unit, thereby causing overheating.

FIGS. 2A, 2B, and 2B are waveform diagrams of the general LED drive constant current circuit having a multistage structure. As shown in FIGS. 2A, 2B, and 2C, a waveform through a power supply using the constant current circuit using a plurality of stages shown in FIG. 1 is controlled as shown in FIG. 2A and a current according to a voltage A is controlled to be a current B having a multistage structure. The general waveform structure, differing according to an environment, additionally includes a circuit corresponding to an overvoltage occurring in an AC power source.

That is, FIG. 2B shows a form of a current C while a protection circuit is not operating, and a current D while the protection circuit is operating. That is, when the protection circuit operates in a form of the current C having a multistage structure, the current C of the constant current drive unit shows the form of the current D entirely reduced.

Also, FIG. 2C shows, in a waveform of a voltage E generated with the overvoltage, a flow of a current F instantaneously disconnecting a current in a section, in which the overvoltage occurs. According thereto, generally, a protection circuit is design to correspond to an overvoltage in a manner of (b) or (c) in FIG. 2.

However, as shown in FIG. 2B, a method of entirely decreasing a current has a limitation, in which heat emission occurring due to a continuous overvoltage may cause a problem in a system. Also, as shown in FIG. 2C, a method of disconnecting a current has a limitation, in which a flicker phenomenon partially occurs to make intensity of illumination of an LED module unstable.

FIGS. 3A and 3B are circuit diagrams of a general constant current circuit of one stage of a constant current drive circuit having a multistage structure, and FIG. 4 is a waveform diagram of the general constant current circuit of one stage of the constant current drive circuit having the multistage structure. The structure of the constant current circuit of FIG. 1 may not only be applied to a multistage structure but may be applied to a case of FIGS. 3 and 4 formed of one constant current circuit as a protection circuit. Also, the structure may be applied as constant current circuits of all stages or some stages.

SUMMARY OF THE INVENTION

The present invention provides a voltage-based current control unit coupled with a general constant current control unit, which is added to overcome overheating occurring according to an input of an alternative current (AC) voltage and instability of intensity of illumination or to overcome a life of a light emitting diode (LED).

The present invention also provides, when an overvoltage occurs due to an input AC power, an operation of limiting a current of the overvoltage applied to an LED module proportional to a degree of the overvoltage.

The present invention also provides an operation of limiting a current to a desirable degree while preventing a flicker effect of an LED module using a smaller expense than a general switching type overvoltage protection circuit.

The present invention also provides an operation of delaying an operation time of a current limitation circuit according to an overvoltage by adding reference voltage sources in series to a circuit including a voltage-based current control unit.

The present invention also provides a constant current control unit formed with a current security unit added, thereby providing a minimum current while a complex overvoltage protection unit is operating in the constant current control unit.

The present invention also provides a temperature compensation unit coupled with the inside of a constant current control unit to prevent a decrease in power according an increase in a temperature.

The present invention also provides an overheating sensing unit coupled with a voltage-based current control unit to prevent a destruction of a circuit unit caused by an increase in a temperature.

Embodiments of the present invention provide AC direct drive LED power supplies for handling an overvoltage, including a power input unit receiving an AC power, a rectifier unit for generating an undulating current by rectifying the AC power outputted from the power input unit, an LED array unit connected to receive the undulating current from the rectifier unit and formed of one or more LED modules, a constant current control unit connected to the LED array unit and controlling so as to allow a certain rated current or less to flow by modifying a waveform of the undulating current applied to the LED array unit, and a voltage-based current control unit driven by a voltage of both ends of the constant current control unit and continuously decreasing a current value of an overvoltage supplied form the power input unit according to a level of the overvoltage.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
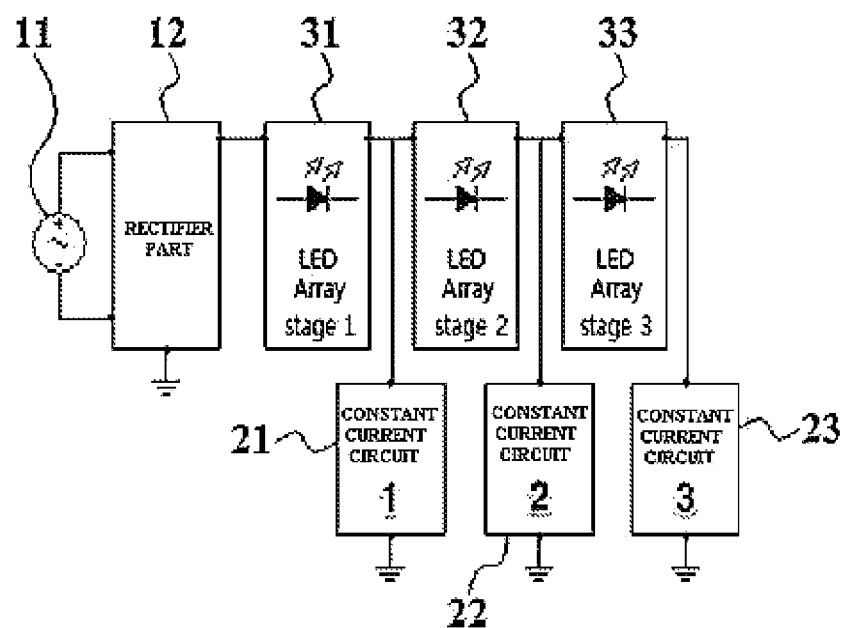
FIG. 1 is a circuit diagram of a general LED drive constant current circuit having a multistage structure.
Figure 2:
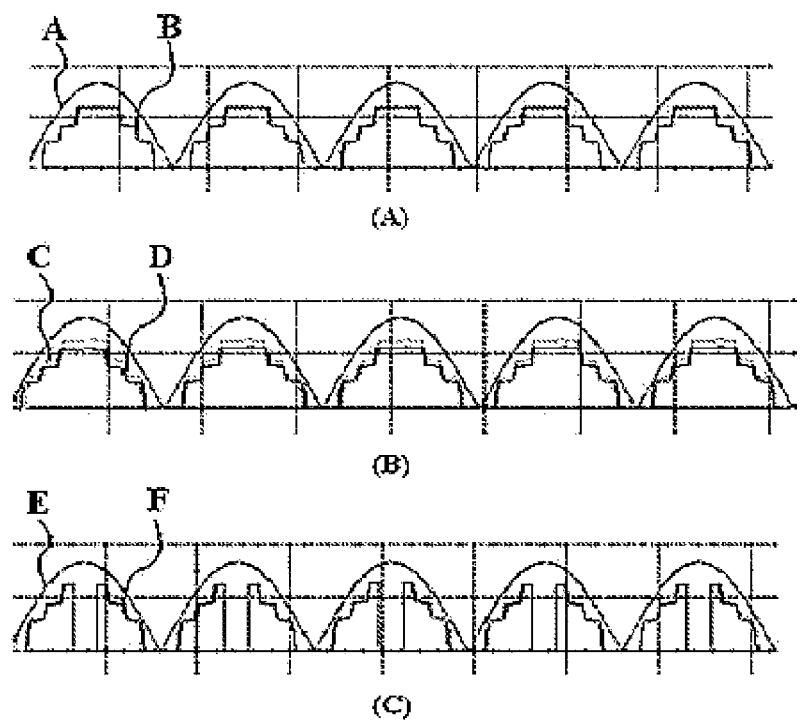
FIGS. 2A, 2B, and 2C are waveform diagrams of the general LED drive constant current circuit having a multistage structure.

Terms and words used in the present disclosure and claims will not be understood being limited to general or lexical meanings. In an aspect that the inventor may properly define the concept of the terms in order to describe embodiments in the best way, the terms will be understood as meanings and concepts appropriate to the technical thoughts of the embodiments.

Accordingly, the embodiments disclosed in the specification and configurations illustrated in the drawings are just most exemplary embodiments, which do not represent the whole technical thoughts of the present embodiments. It should be understood various equivalents replaceable therefore and modified examples thereof may exist at the point in time of filing the present application.

Hereinafter, exemplary embodiments of the present invention will be described in detail.

Figure 5:
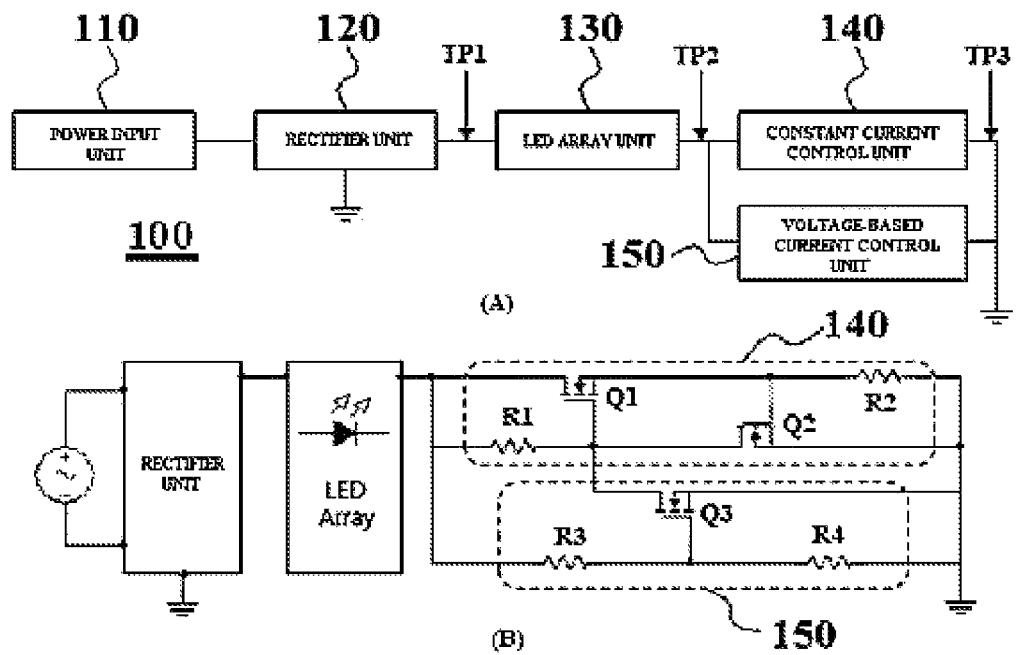
FIGS. 5A and 5B are circuit diagrams of a constant current circuit for driving a light emitting diode (LED) according to an embodiment of the present invention.
Figure 6:
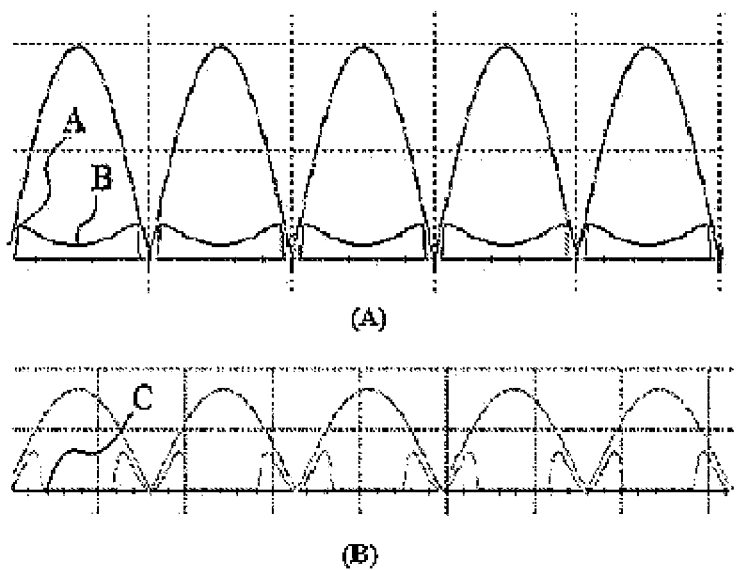
FIGS. 6A and 6B are waveform diagrams of the constant current circuit of FIGS. 5A and 5B.

FIGS. 5A and 5B are circuit diagrams of a constant current circuit for driving a light emitting diode (LED) according to an embodiment of the present invention, and FIGS. 6A and 6B are waveform diagrams of the constant current circuit of FIGS. 5A and 5B. As shown in FIG. 5A, an LED power supply device 100 includes a power input unit 110, a rectifier unit 120 for rectifying an alternative current (AC) power outputted from the power input unit 110 to be converted into a direct current (DC) power (an undulating power), an LED array unit 130 receiving power from the rectifier unit 120 and including at least one LED module, a constant current control unit 140 connected to the LED array unit 130 to control a current, and a voltage-based current control unit 150 operated by a voltage between both ends of the constant current control unit 140.

The power input unit 110 is configured to receive an external AC current and transfers an inputted AC power to the rectifier unit 120.

The rectifier unit 120 is configured to rectify an AC current outputted from the power input unit 110 to be converted into an undulating power, in which an overvoltage that may be leaded in from the AC power is not filtered but is transferred to the LED array unit 130.

The LED array unit 130 is formed of one or more LED modules coupled with one or more LEDs. The constant current control unit 140 is a constant current drive circuit and is formed of a protection protecting the LED array unit 130 by allowing a rated current or less to flow.

In FIG. 5B, the constant current control unit 140 has a representative configuration of a constant current circuit formed of two field effect transistors (FETs) or bipolar junction transistors (BJTs) and two resistances. When a circuit is driven to a certain voltage, a current flows through a load, that is, the LED array unit 130 and a galvanic voltage occurs at a gate of an FET Q1 due to a pull up resistance of a resistance RE thereby applying a current to between a drain and source of the FET Q1. In this case, when a voltage proportional to a current flowing through both ends of a resistance R2 occurs and the voltage between the both ends of the resistance R2 arrives at a value within a determined range, since a voltage is deserted to a gate of an FET Q2, a resistance value between a drain and source of the FET Q2 is decreased. Due thereto, since a potential applied to the gate of the FET Q2 due to the pull up resistance of the resistance R1 is decreased, a resistance between the drain and source of the FET Q1 increases, thereby maintaining a desirable current. Since it is necessary to uniformly maintain a voltage supplied to the LED array unit 130, that is, a voltage between a test point TP1 and a test point TP2, a voltage excluding a voltage used by the LED array unit is applied to between the drain and source of the FET Q1 while an overvoltage is being applied.

The voltage-based current control unit 150 is driven by a voltage between both ends TP2 and TP3 of the constant current control unit 140 and continuously decreases a current value according to a level of the overvoltage supplied from the power input unit 110. That is, in case of a protection circuit perfectly breaking a current, since an LED module goes out, a flicker effect caused by control may occur. However, when including the voltage-based current control unit 150, since an amount of a flowing current may be fluidly controlled, the flicker effect caused by an overvoltage protection circuit or an overvoltage may be prevented. Also, it is possible to prevent harmonic waves that may occur due to rapid switching.

As shown in FIG. 5B, the voltage-based current control unit includes an FET Q3, connects a drain and source of the FET Q3 to the drain and source of the FET Q2, respectively, and connects resistances R3 and R4 to the both ends of the constant current control unit 140, thereby monitoring a voltage occurring when an overvoltage is applied to the constant current control unit 140. In this case, the resistance R3 and resistance R4 are properly defined to have values to be set to allow a control for the overvoltage and are connected to a gate of the FET Q3.

Accordingly, although a waveform of a current using a circuit shown in FIG. 5B is driven as a determined current as shown in FIG. 6A, in case of a voltage more than a certain level, a small amount of current flows as a maximum current limitation B proportional to a level of an input voltage at a current limitation stating point A. In this case, although an overvoltage status is maintained for a long time, since a current flows low while the overvoltage is being applied, heat generated by a drive unit is reduced.

Also, FIG. 6B is a circuit extremely applying a current limitation caused by an overvoltage and allowing a current only to flow both apexes of an AC waveform, which may be applied and used when designing an LED drive circuit having a plurality of stages.

Figure 7:
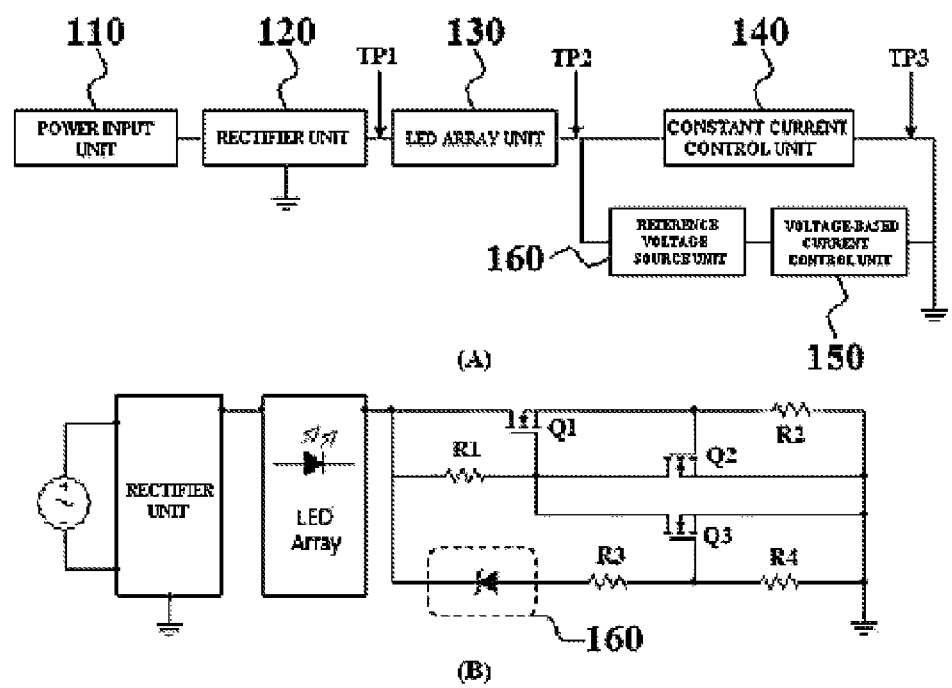
FIGS. 7A and 7B are circuit diagrams of a constant current circuit for driving an LED according to another embodiment of the present invention.
Figure 8:
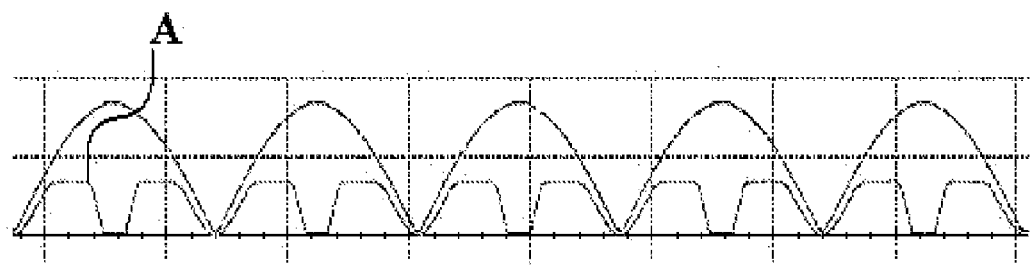
FIG. 8 is a waveform diagram of the constant current circuit of FIGS. 7A and 7B.

FIGS. 7A and 7B are circuit diagrams of a constant current circuit for driving an LED according to another embodiment of the present invention, and FIG. 8 is a waveform diagram of the constant current circuit of FIGS. 7A and 7B. As shown in FIGS. 7A and 7B, the constant current circuit for driving the LED includes a reference voltage source unit 160 provided between the LED array unit 130 and the voltage-based current control unit 150 and connected to the resistance R3 provided to the voltage-based current control unit 150 controlling a current flowing through the LED array unit 130 in addition to the constant current circuit of FIGS. 5A and 5B.

The reference voltage source 160 is connected in series between the LED array unit 130 and the voltage-based current control unit 150 or the gate of the FET Q3 to delay an operation time of the voltage-based current control unit 150 according to an overvoltage. A waveform of current according thereto may be precisely controlled, as shown in FIG. 8, by delaying a current limitation point in time A that is the operation time of the voltage-based current control unit 150 for protection against the overvoltage. Also, the waveform may be used to read a reference voltage.

Figure 9:
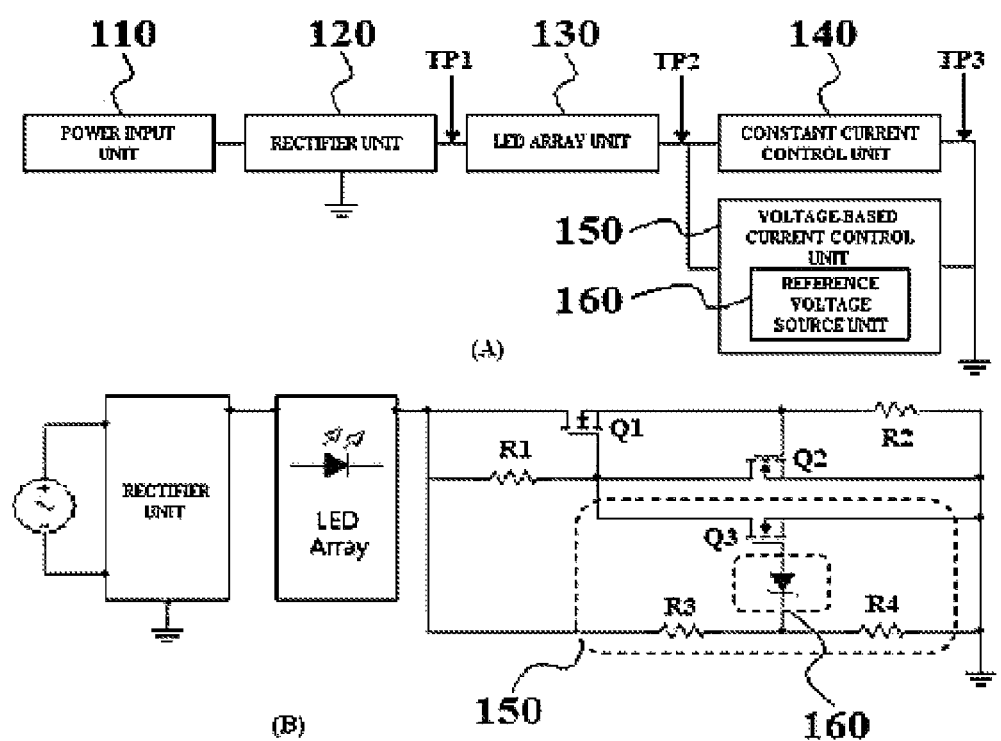
FIGS. 9A and 9B are circuit diagrams of a constant current circuit for driving an LED according to still another embodiment of the present invention.

FIGS. 9A and 9B are circuit diagrams of a constant current circuit for driving an LED according to still another embodiment of the present invention. As shown in FIG. 9A, the constant current circuit based on the constant current circuit of FIGS. 5A and 5B includes the reference voltage source unit 160 in the voltage-based current control unit 150. As shown in FIG. 9B, the reference voltage source unit 160 is connected in series between a voltage distribution point between the resistance R3 and the resistance R4 included in the voltage-based current control unit 150 and a gate electrode of the FET Q3.

The embodiment shown in FIGS. 9A and 9B relates to another method of using the reference voltage source unit 160, which has a different configuration from the embodiment shown in FIGS. 7A and 7B but has similar operation properties thereto.

Figure 10:
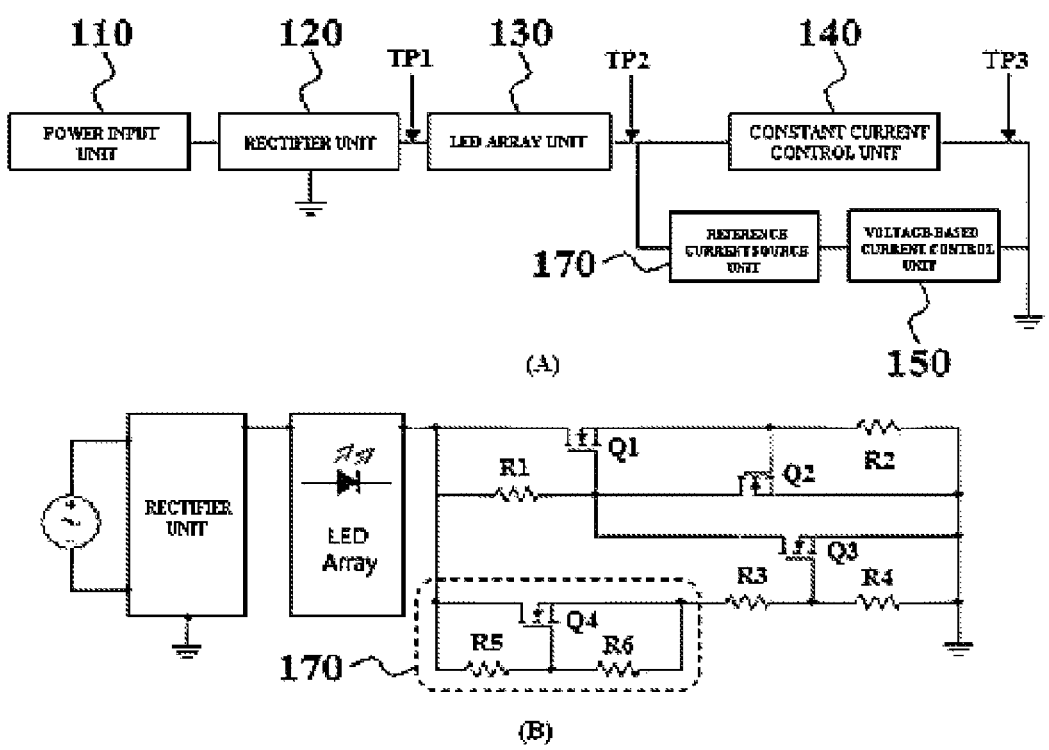
FIGS. 10A and 10B are circuit diagrams of a constant current circuit for driving an LED according to even another embodiment of the present invention.

FIGS. 10A and 10B are circuit diagrams of a constant current circuit for driving an LED according to even another embodiment of the present invention. As shown in FIGS. 10A and 10B, the constant current circuit for driving the LED includes a reference current source unit 170 provided between the LED array unit 130 and the voltage-based current control unit 150 and connected to the resistance R3 provided to the voltage-based current control unit 150 controlling a current flowing through the LED array unit 130 in addition to the constant current circuit of FIGS. 5A and 5B.

The reference current source unit 170 is a structure substituted for the reference voltage source unit 160, in which since a current may be applied when being more than a reference current, it is necessary to input a voltage more than a certain level to both ends thereof and to control a current of about several μA. Accordingly, the reference current source unit 170, similar to the reference voltage source unit 160, also delays a current limitation point in time and may be used for reading out the reference current.

As shown in FIG. 10B, the reference current source unit 170 includes an FET Q4 and resistances R5 and R6 connected to a front end of a gate electrode of the FET Q4 and determining an amount of current.

Figure 11:
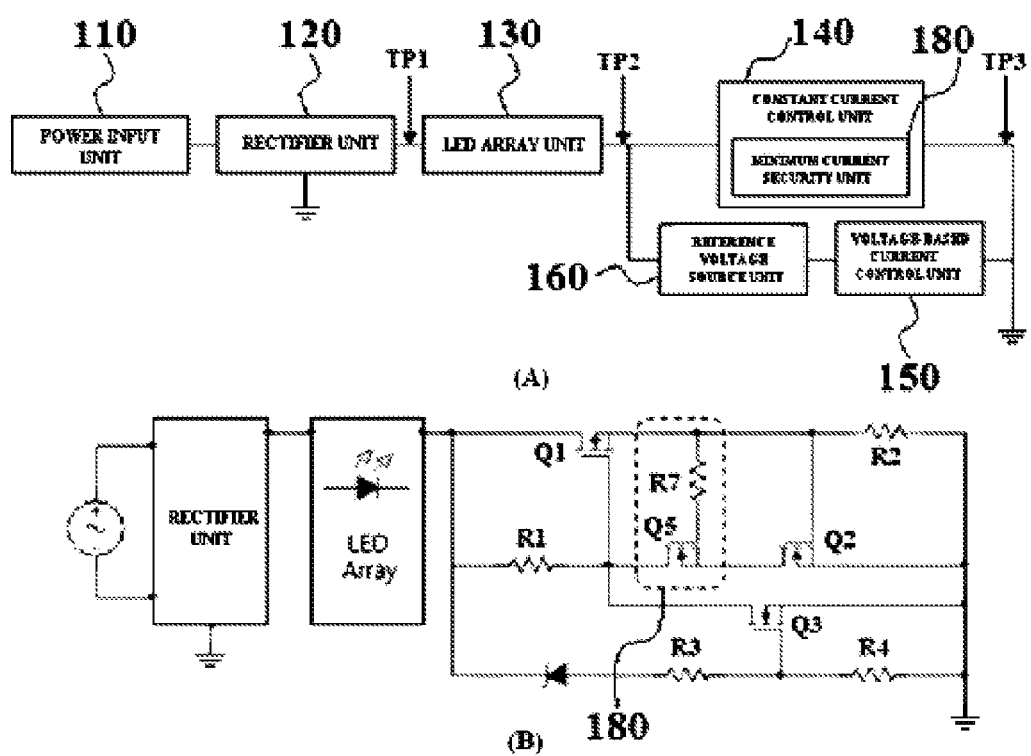
FIGS. 11A and 11B are circuit diagrams of a constant current circuit for driving an LED according to yet another embodiment of the present invention.

FIGS. 11A and 11B are circuit diagrams of a constant current circuit for driving an LED according to even another embodiment of the present invention. The constant current circuit of FIGS. 11A and 11B based on the constant current circuit of FIGS. 7A and 7B includes a minimum current security unit 180 in the constant current control unit 140. The minimum current security unit 180 is connected to the resistance R1 connected to the LED array unit 130 and a source electrode of the FET Q2. On the other hand, the minimum current security unit 180, as shown in FIG. 11B, includes an FET Q5 connected to the resistance R1 of the constant current control unit 140 and a resistance R7 connected to a gate electrode of the FET Q5.

The minimum current security unit 180 is a circuit providing a minimum current for driving an LED and may form a constant current circuit while providing a minimum amount of current when being used together with the voltage-based current control unit 150, thereby easily inducing and designing a desirable circuit. According thereto, a current is limited as much as a flicker effect occurs while controlling the current. The minimum current security unit 180 is added to forcibly securing a minimum current not to cause the flicker effect, thereby inducing a control section.

Figure 12:
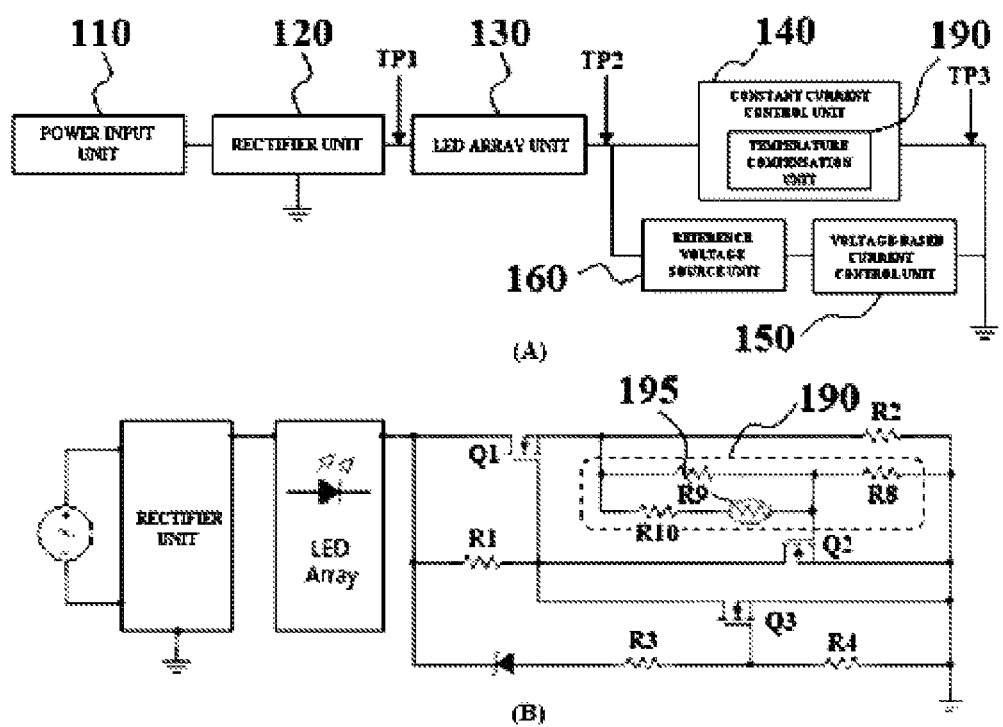
FIGS. 12A and 12B are circuit diagrams of a constant current circuit for driving an LED according to a further embodiment of the present invention.

FIGS. 12A and 12B are circuit diagrams of a constant current circuit for driving an LED according to a further embodiment of the present invention. As shown in FIGS. 12A and 12B, the constant current circuit of FIGS. 12A and 12B based on the constant current circuit of FIGS. 7A and 7B includes a temperature compensation unit 190 in the constant current control unit 140, receiving a current from the resistance R2 and connected to the gate electrode of the FET Q2.

The temperature compensation unit 190 includes a resistance R8 connected to the resistance R2 and resistances R9 and R10 connected to a front end of the gate electrode of the FET Q2 and connected in series from a drain of the resistance R8, in which a thermistor 195 is provided on a front end of the resistance R10.

That is, when a temperature becomes higher, the constant current control unit 140, in order to prevent power from being decreased, compensates a change in current according to a change in temperature by forming a circuit for compensating a temperature together with the thermistor 195. A resistance connected to the thermistor 195 in series, although the constant current control unit 140 operates without the resistance, is provided in order to function as a damper because a malfunction, that is, an over current may occur when a light source is driven at temperatures at zero or below and a circuit unit drives, thereby rapidly increasing heat.

Figure 13:
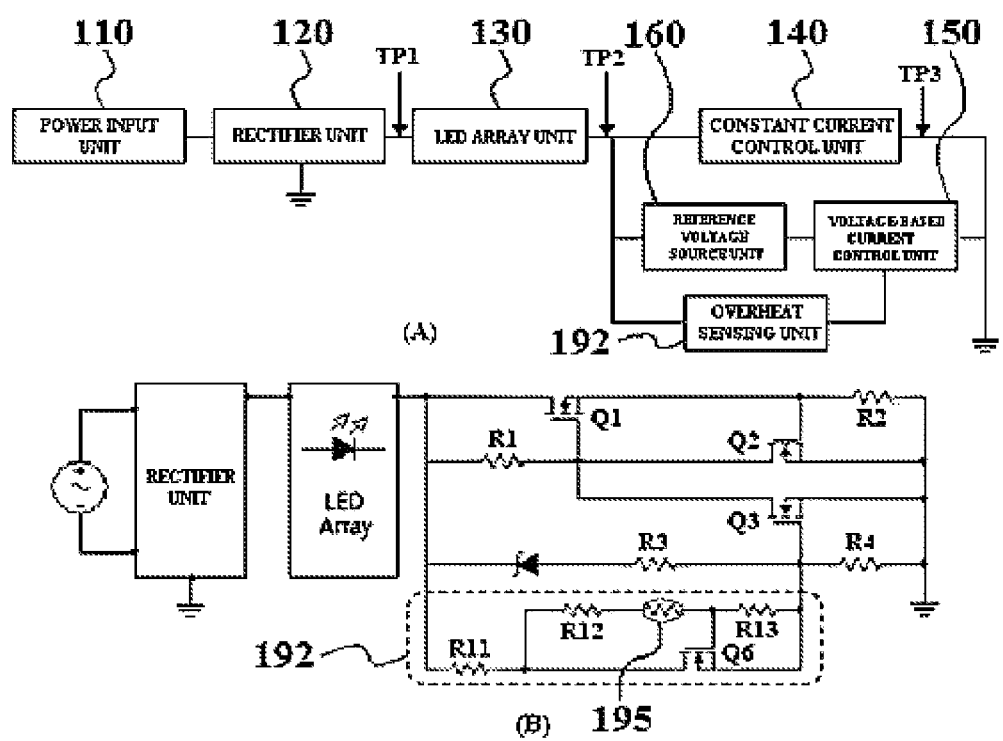
FIGS. 13A and 13B are circuit diagrams of a constant current circuit for driving an LED according to a still further embodiment of the present invention.

FIGS. 13A and 13B are circuit diagrams of a constant current circuit for driving an LED according to a still further embodiment of the present invention. As shown in FIGS. 13A and 13B, the constant current circuit of FIGS. 13A and 13B based on the constant current circuit of FIGS. 7A and 7B includes an overheating sensing unit 192 connected to the LED array unit 130 and a gate electrode of the voltage-based current control unit 150 and connected to the reference voltage source unit 160 in series.

The overheating sensing unit 192 includes a resistance 11 connected to the constant current control unit 140, an FET Q6 connected to the resistance 11, a resistance R12 connected to a source of the FET Q6 from the resistance R11, and a resistance R13 connected to the thermistor 195, in which a gate electrode of the FET Q6 is connected to a rear end of the thermistor 195 and a front end of the resistance R13.

The overheating sensing unit 192 is provided in order to prevent a damage caused by overheating by additionally limiting a current according to a temperature by monitoring a change in temperature.

When it becomes an overheating status set in FIG. 13B, a resistance value of the thermistor 195 decreases, thereby also decreasing a total sum value of the resistances R11 and R12 and the thermistor 195. Accordingly, since a galvanic voltage is maintained at a connection point with the resistance R13, that is, a gate of the FET Q6 having a fixed value, a resistance value of the drain and source of the FET Q3 decrease. Since the decreased resistance value between the drain and source of the FET Q3 is connected in series to a resistance value between the drain and source of the FET Q2 allowing a constant current at the gate of the FET Q1 to be maintained, the gate of the FET Q1 has a galvanic voltage lower than a normal state in such a way that a current supplied to the LED array unit 130 acts inversely proportional to a temperature determined as a preset overheat.

Figure 14:
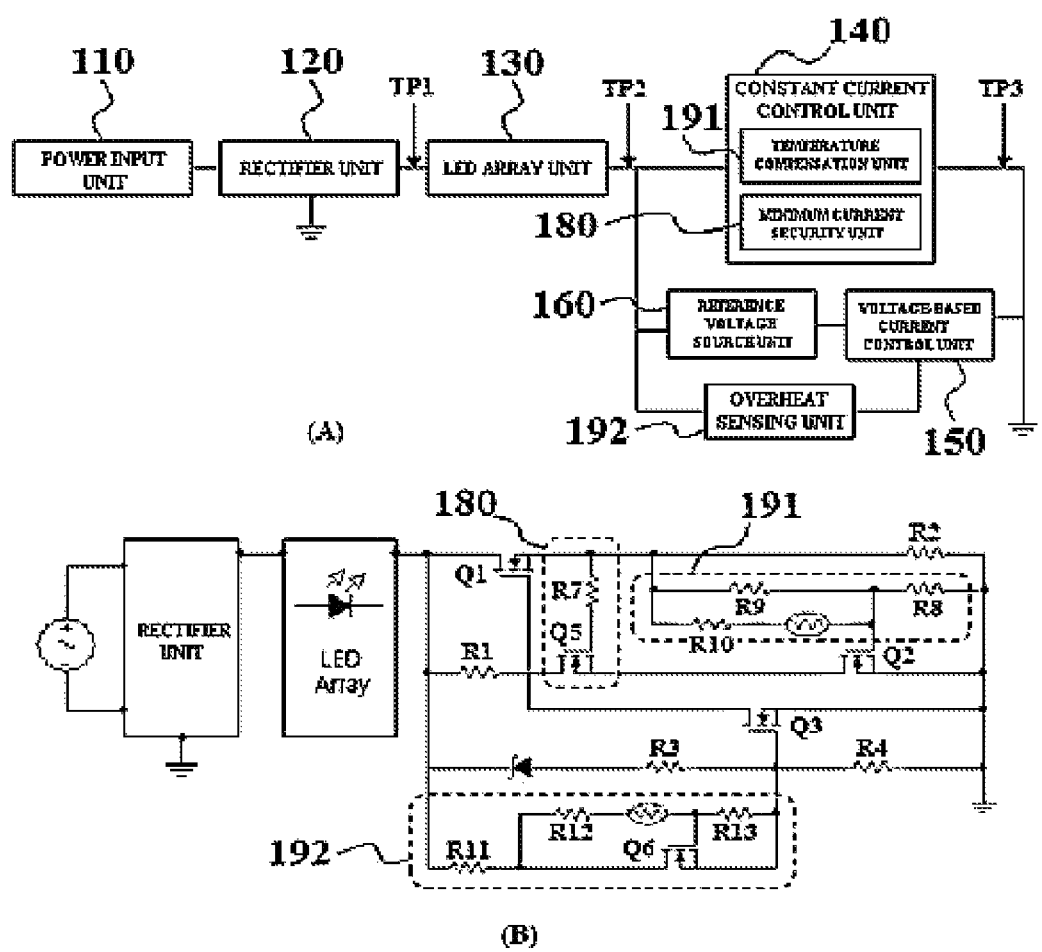
FIGS. 14A and 14B are circuit diagrams of a constant current circuit for driving an LED according to an even further embodiment of the present invention.

FIGS. 14A and 14B are circuit diagrams of a constant current circuit for driving an LED according to an even further embodiment of the present invention. As shown in FIGS. 14A and 14B, the constant current circuit of FIGS. 14A and 14B based on the constant current circuit of FIGS. 7A and 7B includes the minimum current security unit 180 included in the constant current control unit 140 of the embodiment shown in FIGS. 11A and 11B, a temperature compensation unit 191 identical to the temperature compensation unit 190 included in the constant current control unit 140 of the embodiment shown in FIGS. 12A and 12B, and the overheating sensing unit 192 identical to the overheating sensing unit 192 connected in series to the reference voltage source unit 160 in the embodiment shown in FIGS. 13A and 13B.

Figure 15:
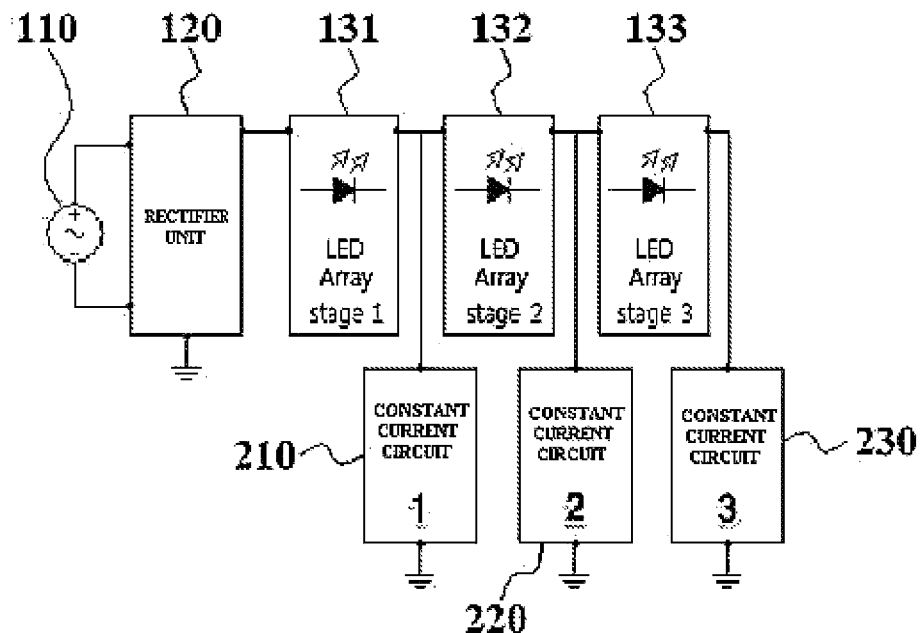
FIG. 15 is a view illustrating an example of a constant current circuit having a multistage structure using the embodiments of the present invention.

FIG. 15 is a view illustrating an example of a constant current circuit having a multistage structure using the embodiments of the present invention. FIGS. 16A, 16B, 16C, and 16D are waveform diagrams illustrating another example of combining the embodiment of FIGS. 5A and 5B. As shown in FIG. 15, LED arrays connected in series are divided appropriately into stages 131, 132, and 133 and amounts of constant current of the respective stages 131, 132, and 133 differ to be sequentially controlled.

Figure 3:
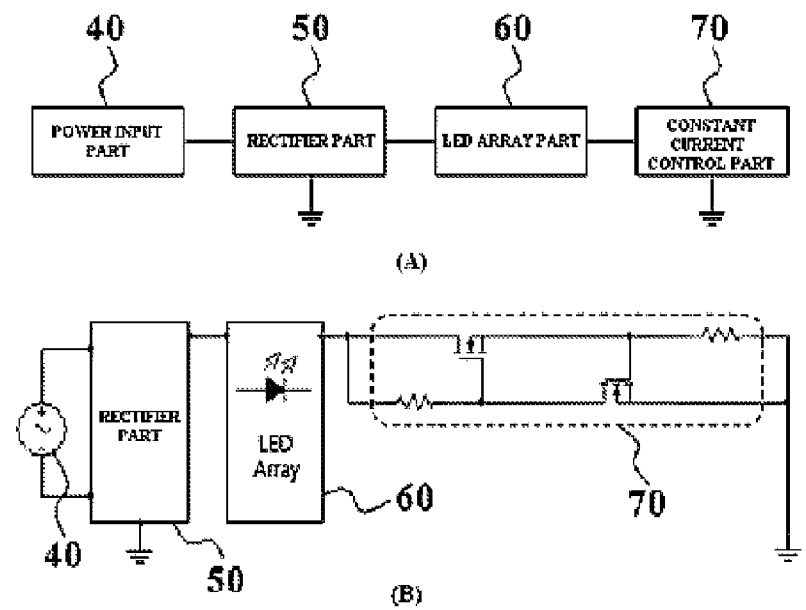
FIGS. 3A and 3B are circuit diagrams of a constant current circuit of one stage of the constant current drive circuit having a multistage structure.
Figure 4:
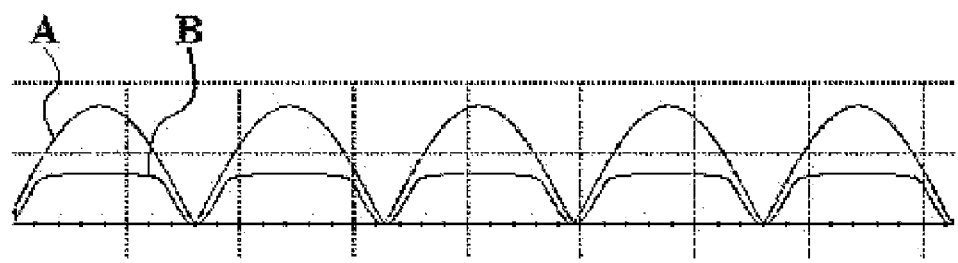
FIG. 4 is a waveform diagram of the constant current circuit of one stage of the constant current drive circuit having a multistage structure.
Figure 16:
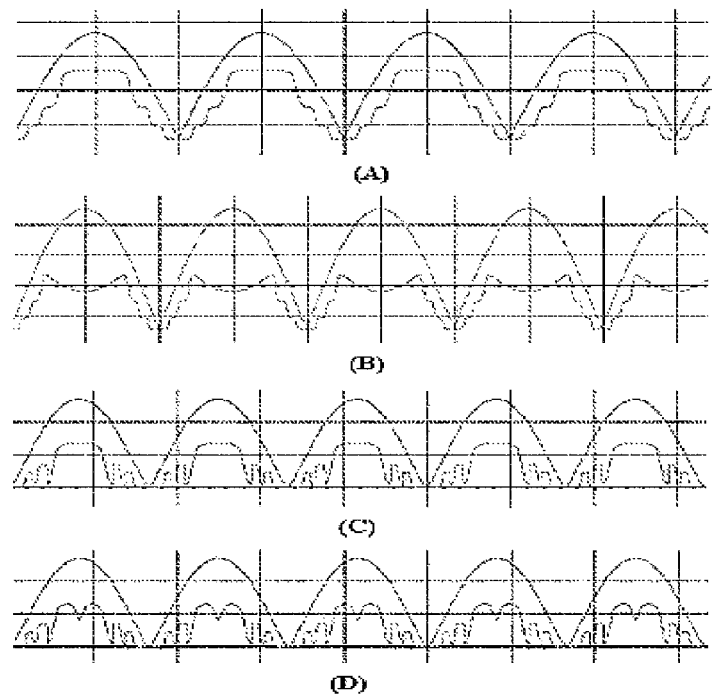
FIGS. 16A, 16B, 16C, and 16D are waveform diagrams illustrating another example of combining the embodiments of FIGS. 5A and 5B.

Respective waveforms used in the constant current circuit may be as shown in. 16A, 16B, 16C, and 16D. In FIG. 16A, a first stage 131 and a second stage 132 are formed of general constant current circuits shown in FIGS. 3A and 3B and a third stage 133 is formed of the constant current circuit of FIGS. 5A and 5B. In this case, in a normal operation, there is shown a flow of current having a regularly stepped waveform.

In FIG. 16B, when an overvoltage is applied to the circuit diagram shown in FIG. 16A, a protection circuit of the third stage 133 operates and applies a current limitation according to a voltage. A current flow is smallest at an apex on which a highest voltage is applied.

In FIG. 16C, the first to third stages 131, 132, and 133 are formed of the constant current circuits of FIGS. 5A and 5B. Points where the respective stages are converted are definitely cut.

In FIG. 16D, the protection circuit operates when an overvoltage occurs in the circuit diagram of FIG. 16C.

Figure 17:
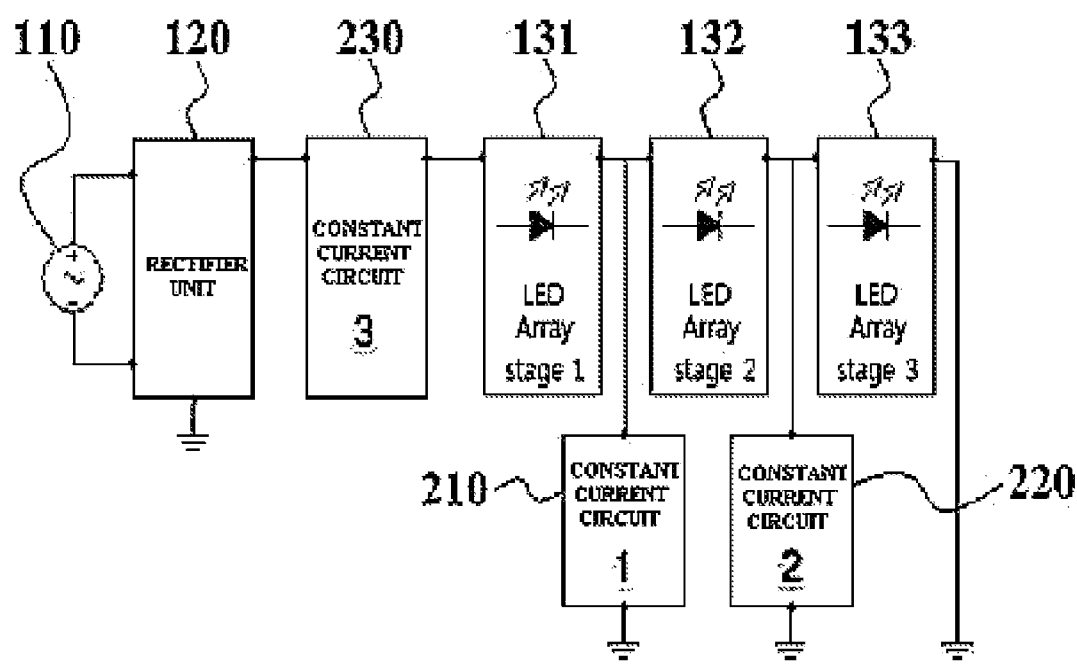
FIG. 17 is a view illustrating another example of the constant current circuit having the multistage structure using the constant current circuits according to the embodiments of the present invention.

FIG. 17 is a view illustrating another example of the constant current circuit having the multistage structure using the constant current circuits according to the embodiments of the present invention. As shown in FIG. 17, a constant current circuit 1 210 and a constant current circuit 2 220 function as general circuits and a constant current circuit 3 230 functions as the protection circuit using the embodiments as described above.

Accordingly, Ac direct drive LED power supply capable of handling an overvoltage occurring due to an input AC power additionally includes a voltage-based current control unit combined with a general constant current control unit, thereby limiting a current of the overvoltage applied to an LED module proportional to a level of the overvoltage.

Also, a voltage sensing unit is added in series to a circuit including a voltage-based current control unit, thereby delaying a point in time when a current limitation circuit operates according to a high voltage and precisely controlling an operating point in time of an overvoltage protection circuit.

Also, since a constant current control unit may be configured while securing a minimum current amount at the constant current control unit by using a minimum current security unit formed together with the constant current control unit, a desirable circuit may be easily induced and designed.

Also, a temperature compensation unit combined with the inside of a constant current control unit is provided, thereby preventing a decrease in power caused by an increase in temperature.

Also, an overheating sensing unit combined with a voltage-based current control unit is provided, thereby preventing a destruction of a circuitry caused by an increase in temperature.

Also, compared with a general switching type overvoltage protection circuit, a minimum amount of current may be secured within a desirable range using a small expense, a desirable current limitation may be drawn, and a stable intensity of illumination may be provided.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An alternative current (AC) direct drive light emitting diode (LED) power supply handling an overvoltage, comprising:
   a power input unit receiving an AC power;
   a rectifier unit for generating an undulating current by rectifying the AC power outputted from the power input unit;
   an LED array unit connected to receive the undulating current from the rectifier unit and formed of one or more LED modules;
   a constant current control unit connected to the LED array unit and controlling the undulating current so as not to exceed a predetermined current value by modifying a waveform of the undulating current applied to the LED array unit; and
   a voltage-based current control unit driven by a voltage of both ends of the constant current control unit,
   wherein the voltage-based current control unit decreases the undulating current flow toward zero as the voltage level of the constant current control unit is a certain level, and
   wherein the constant current control unit comprises
      a first field effect transistor (FET) Q1 having a source electrode, a drain electrode and a gate electrode, the source electrode of the first FET Q1 being connected to an output of the LED array unit,
      a second field effect transistor (FET) Q2 having a source electrode, a drain electrode and a gate electrode, the source electrode of the second FET Q2 being connected to the gate electrode of the first FET Q1, the gate electrode of the second FET Q2 being connected to the drain electrode of the first FET Q1, the drain electrode of the second FET Q2 being connected to a ground,
      a first resistor R1 connected between the source electrode of the first FET Q1 and the gate electrode of the first FET Q1, and
      a second resistor R2 connected between the gate electrode of the second FET Q2 and the drain electrode of the second FET Q2, and
   wherein the voltage-based current control unit comprises
      a third field effect transistor (FET) Q3 having a source electrode, a drain electrode and a gate electrode, the source electrode of the third FET Q3 being connected to the gate electrode of the first FET Q1, the drain electrode of the third FET Q3 being connected to the ground,
      a third resistor R3 connected between the source electrode of the first FET Q1 and the gate electrode of the third FET Q3, and
      a fourth resistor R4 connected between the gate electrode of the third FET Q3 and the drain electrode of the third FET Q3.

* * * * *